(12) United States Patent
Wagner

(10) Patent No.: US 6,348,122 B1
(45) Date of Patent: *Feb. 19, 2002

(54) FIRE RETARDING POLYPROPYLENE COMPOSITION

(75) Inventor: Jerry Wagner, Drums, PA (US)

(73) Assignee: Compression Polymers Group, Drums, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,374

(22) Filed: Jan. 8, 1998

(51) Int. Cl.$^7$ ............................................. B32B 31/20
(52) U.S. Cl. .................. 156/308.2; 73/865.6; 523/202; 523/205; 524/436
(58) Field of Search ................................ 523/202, 205; 524/436; 156/308.2; 73/865.6

(56) References Cited

U.S. PATENT DOCUMENTS

| | | | |
|---|---|---|---|
| 3,702,592 A | | 11/1972 | Gamble |
| 4,098,762 A | * | 7/1978 | Miyata et al. ............... 524/436 |
| 4,145,404 A | | 3/1979 | Miyata et al. |
| 4,407,992 A | | 10/1983 | Keogh |
| 4,541,545 A | | 9/1985 | Beattie et al. |
| 4,549,041 A | | 10/1985 | Shingo et al. |
| 4,671,896 A | | 6/1987 | Hasegawa et al. |
| 4,772,959 A | | 9/1988 | Amano et al. |
| 4,829,119 A | | 5/1989 | Ishino et al. |
| 4,845,146 A | | 7/1989 | Inoue et al. |
| 4,851,463 A | | 7/1989 | Opsahl et al. |
| 4,879,332 A | | 11/1989 | Saito et al. |
| 4,885,328 A | | 12/1989 | Danforth et al. |
| 4,939,195 A | | 7/1990 | Ishino et al. |
| 4,963,610 A | | 10/1990 | Schmid et al. |
| 5,139,875 A | | 8/1992 | Metzemacher et al. |
| 5,143,965 A | | 9/1992 | Mertz |
| 5,155,159 A | | 10/1992 | Ohmae et al. |
| 5,180,767 A | | 1/1993 | Sakai et al. |
| 5,211,746 A | | 5/1993 | Keogh et al. |
| 5,215,581 A | | 6/1993 | Stewart et al. |
| 5,216,063 A | | 6/1993 | Williams |
| 5,256,718 A | | 10/1993 | Yamamoto et al. |
| 5,256,719 A | | 10/1993 | Sham et al. |
| 5,262,467 A | | 11/1993 | Keogh et al. |
| 5,317,051 A | | 5/1994 | Harashige et al. |
| 5,378,750 A | | 1/1995 | El Sayed et al. |
| 5,416,143 A | | 5/1995 | El Sayed et al. |
| 5,418,272 A | | 5/1995 | Kawabata et al. |
| 5,461,101 A | * | 10/1995 | Rothon et al. ............... 524/436 |
| 5,475,041 A | | 12/1995 | Weil et al. |
| 5,510,166 A | | 4/1996 | Inoue et al. |
| 5,521,259 A | | 5/1996 | Tsumura et al. |
| 5,843,389 A | * | 12/1998 | Elsner et al. ............... 524/436 |

FOREIGN PATENT DOCUMENTS

| | | | | |
|---|---|---|---|---|
| DE | 2018432 | * | 12/1971 | ............... 156/308.2 |
| JP | 57-92037 | * | 6/1982 | ................. 523/205 |

* cited by examiner

Primary Examiner—John J. Gallagher
(74) Attorney, Agent, or Firm—Standley & Gilcrest LLP

(57) ABSTRACT

A fire retarding polypropylene composition comprising a copolymer of polypropylene and an ethylene/propylene rubber, and at least about 50% by weight but not greater than 60% by weight of a magnesium hydroxide coated with an anionic surface active agent, the magnesium hydroxide having (i) a strain in the <101> direction of not more than $3.0 \times 10^{-3}$, (ii) a crystallite size in the <101> direction of more than 800 Å, and (iii) a specific surface area, determined by the BET method, of less than 20 mg$^2$/g. The composition can be used in a fire retarding semiconductor apparatus which passes the FMRC Clean Room Materials Flammability Test Protocol.

11 Claims, 2 Drawing Sheets

FIRE RETARDING POLYPROPYLENE COMPOSITION

BACKGROUND OF THE INVENTION

This invention relates generally to fire retarding polymers, and more particularly to a fire retarding polypropylene.

In the manufacture of semiconductors, clean rooms must be used. The semiconductor chip processing equipment and other equipment in the clean rooms, such as wet benches, wafer storage cabinets, and the like, must meet certain flammability tests. Factory Mutual Research Corporation (FMRC) has proposed a flammability standard for clean room equipment, entitled "FMRC Clean Room Materials Flammability Test Protocol" (Rev. 2.0, February 1997) (the "FM 4910 Standard"). Recommendations pertaining to the instant invention are found in *Loss Prevention Data, Semiconductor Fabrication Facilities,* (Factory Mutual Engineering Corp., 1997), Section 2.4 Processing Tools and Product Storage. Section 2.4.1 of this publication requires that new wet benches and other processing tools be constructed of noncombustible materials. "Existing wet benches of combustible construction handling corrosive products should be replaced by wet benches in compliance with Section 2.4.1" (Section 2.4.3). "Noncombustible materials, or materials which are FMRC specification tested to meet the FMRC Clean Room Materials Flammability Test Protocol criteria should be used for mini-environment enclosures". (Section 2.4.6).

When there is a fire in a clean room, damage can occur from the fire, the smoke, and/or the corrosive combustion by-products. Even when the damage from the fire is minimal, the smoke and corrosive combustion by-products can ruin the products and the processing equipment and other equipment in the clean room. Thus, even a small fire can cause enormous monetary loss.

Materials which pass the FM 4910 Standard can be made into semiconductor chip processing equipment and clean room equipment without the necessity of providing additional fire detection and suppression equipment, also termed fixed fire protection. This is desirable because false alarms from fire equipment can result in lost wafer production, and consequently, monetary loss. Therefore, materials which pass the FM 4910 Standard are preferred for use in semiconductor chip processing equipment and clean room equipment.

Various materials have been used in the manufacture of semiconductor chip processing equipment and clean room equipment. Thermoplastic materials such as polyvinylidene fluoride (PVDF), perfluoroalkoxy (PFA), polyether ether ketone (PEEK), and polytetrafluoroethylene (PTFE) have been used. While these thermoplastics pass the FM 4910 Standard and therefore can be used without additional fire detection and suppression equipment, they are relatively expensive polymers.

Polyolefin materials, including polypropylene, have also been used for semiconductor chip processing equipment and clean room equipment. Polypropylene, FR-Polypropylene and PVC in semiconductor applications are not used for wetted parts or primary process chemical containment. These materials are used in corrosive wet tool construction as a structural material. They typically compose the plastic box that encloses the process vessels, chemical delivery systems, robots, etc. They also have the function of the process vapor containment and in some applications they are used in plenum drainage and also serve to provide short term containment of process chemicals from process vessel failure. Contact with process fluids is either dilute, intermittent contact, i.e., plenum drainage, or it occurs as the result of splashing while filling process vessels or dripping while transferring wafer boats. The use of polyolefins is advantageous because they are inexpensive polymers. However, no fire retardant polyolefins have been able to pass the FM 4910 Standard. Consequently, fire detection and suppression equipment are required for semiconductor chip processing equipment and clean room equipment made of polyolefins.

Therefore, there is a need for an inexpensive, flame retarding polyolefin composition which will pass the FM 4910 Standard. The composition should be easily processable and capable of being formed into semiconductor chip processing equipment and clean room equipment. The composition should have the necessary physical properties so that it can be used to make the equipment.

BRIEF DESCRIPTION OF THE INVENTION

The present invention provides a flame retarding polypropylene composition (FRPP) that meets the fire resistance requirements for semiconductor clean room materials developed by FMRC in the FM 4910 standard. The composition resists fire propagation and limits smoke and corrosive combustion by products beyond the ability of previous fire retarding polyolefins. This eliminates the need for fire detection and suppression devices (fixed fire protection).

Polypropylene resin pellets and a surface treated magnesium hydroxide ($Mg(OH)_2$) are thermoplastically mixed into pellets. The plastic pellets can then be extruded, compression molded or injection molded into the desired form. High loadings of magnesium hydroxide, greater than 50%, render polypropylene resistant to propagation of fire, smoke and corrosive combustion by-products. Although high loadings of $Mg(OH)_2$ ordinarily render polypropylene too brittle to use as construction material, this is avoided in the instant composition by using a surface treated $Mg(OH)_2$, Kisuma 5A, 5B, or 5J (Kyowa Chemical Industry Co. Ltd., Tokyo distributed in U.S. by Mitsui) as disclosed in Miyata et al., U.S. Pat. No. 4,098,762 and Miyata et al., U.S. Pat. No. 4,145,404, and a specialized reactor copolymer polypropylene resin in which ethylene-propylene rubber has been grafted onto the polypropylene chains to act as an interchain shock absorber. This results in a highly ductile material.

The composition of the instant invention meets all the requirements for Factory Mutual Listing for the FM 4910 Standard. The material exhibits extreme resistance to ignition and fire propagation and yields low smoke and corrosive combustion by-products. It is both impact resistant and rigid and thus ideal for structural materials. It has excellent thermoplastic weld strength and is machinable. It has both high impact resistance and high flex modulus.

DETAILED DESCRIPTION OF THE INVENTION

A fire-retarding polypropylene composition is disclosed. The composition comprises a copolymer of polypropylene (Aristech TI4007, Aristech, Laporte, Tex.) and an ethylene/ propylene rubber, and at least 50% but not greater than 60% by weight of a magnesium hydroxide (Kisuma 5J, 5A or 5B, Kyowa Chemical Industry) coated with an anionic surface active agent, the magnesium hydroxide having (i) a strain in the <101> direction of preferably not more than $3.0 \times 10^{-3}$, (ii) a crystallite size in the <101> direction of preferably more than 800 Å, and (iii) a specific surface area, determined by the BET method, of preferably less than 20 $mg^2/g$.

The copolymer preferably contains between about 80% and about 85% polypropylene and between about 15% and about 20% ethylene/propylene rubber. The copolymer is preferably reactor grade, i.e., made in a reactor as opposed to being compounded. The ethylene-polypropylene rubber has been grafted or spliced into the polypropylene polymer chains with a catalyst that removes hydrogen atoms from polypropylene and substitutes ethylene propylene rubber which functions as an interchain shock absorber. The copolymer is preferably halogen free. The copolymer preferably contains polypropylene, but alternatively, polyethylene may be substituted. Properties of the fire retarding composition disclosed herein are shown in Table I.

Figure 1:
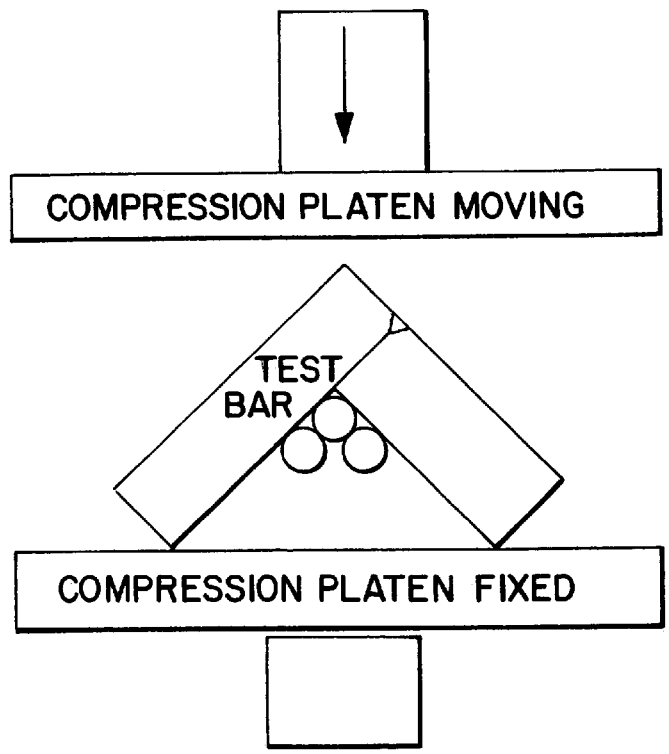
FIG. 1 represents a Corner Weld Strength Test Diagram of Compression Polymers.
Figure 2:
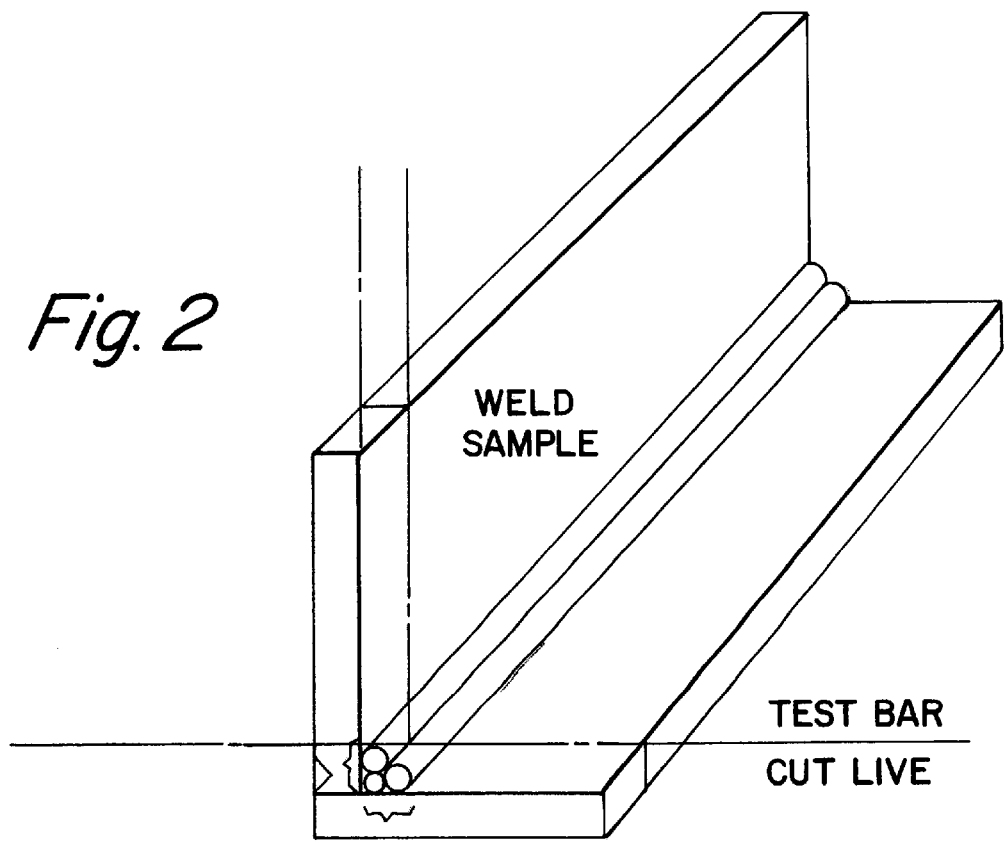
FIG. 2 represents a Corner Weld Strength Test Sample Preparation Diagram.
Figure 3:
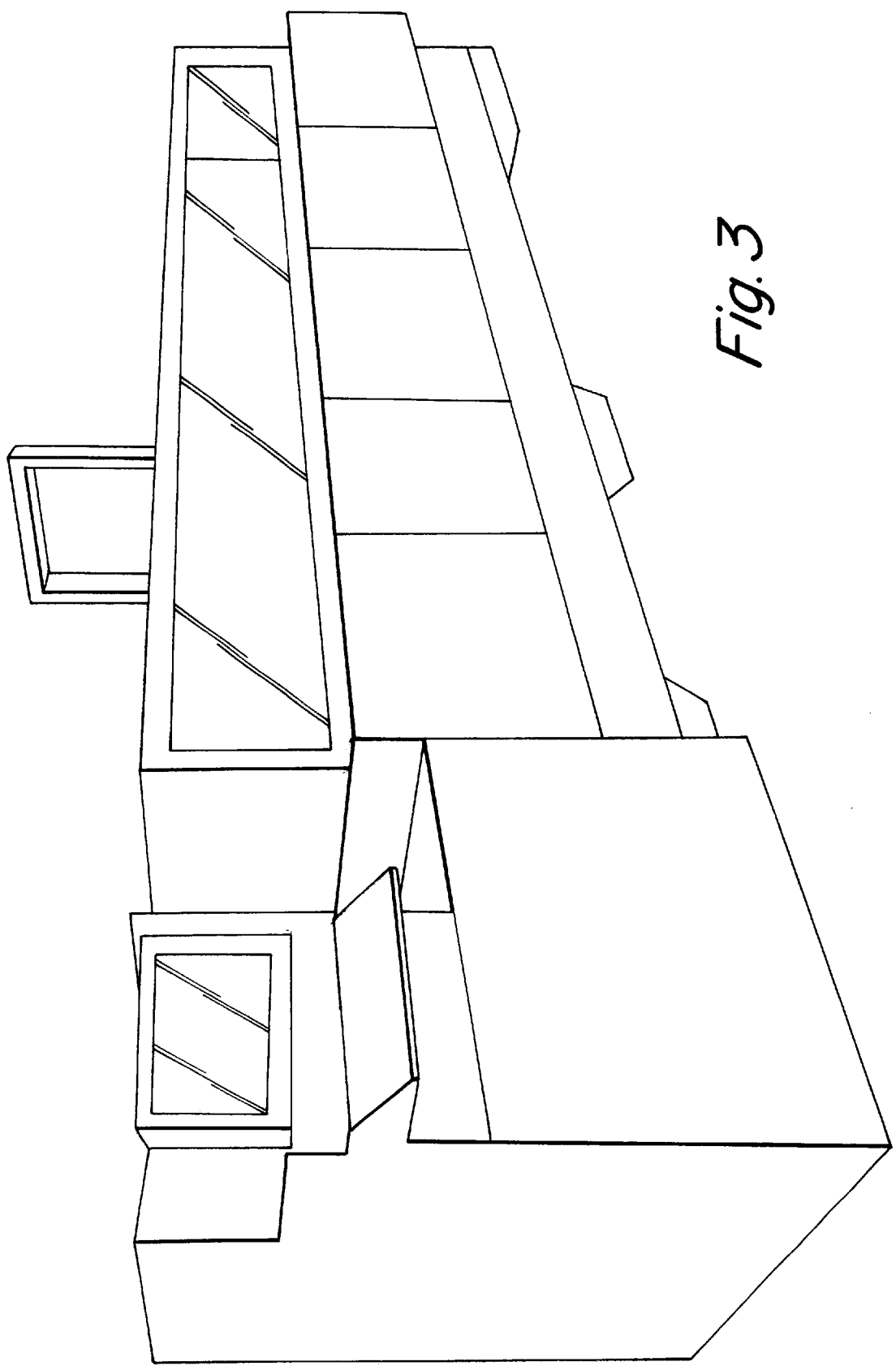
FIG. 3 represents a Wet Deck Displaying Use of FRPP as Structural Material.

FIG. 1 represents a corner weld strength test diagram which can be used to determine the corner weld strength in Table I, and FIG. 2 represents a related corner weld strength test sample preparation diagram.

TABLE I

Composition Properties

| Property | Units | Value | ASTM Method |
| --- | --- | --- | --- |
| Density | g/cc | 1.36–1.38 | D792 |
| Tensile Strength | PSI | 2,500 | D638 |
| Elongation at Yield | % | 4.0 | D638 |
| Flex Modulus | PSI | 450,000 | D790 |
| Izod Impact Notched ⅛ inch | ft-lb per inch | 6.0 | D256 |
| Hardness Shore D | 10 sec | 67 | D785 |
| Heat Deflexion Temp. | 66 PSI | 248° C. | D648 |
| Vicat Softening Pt. | 1 kg | 299° C. | D1525 |
| Corner Weld Strength | lb/linear inch | 570 | CPG Weld Test |
| Water Absorption (7 d. at 122°) | % | <0.07 | D570 |
| Coefficient of Expansion | in/in/° F. | $6.6 \times 10^{-5}$ | D696 |
| Flame Classification | FPI | 4.4 | FM 4910 Protocol Clean Room Listing Report Values |
|  | SDI | 0.2 |  |
|  | CDI | 0.6 |  |
|  | TRP | 570 |  |
| Flame Classification | ETL Labs | V-0 | UL 94 Test |
|  | ETL Labs | 5VA | UL 94 Test |
|  | ETL Labs | <25 flame | E84 Tunnel Test |
|  | ETL Labs | <100 smoke | meets Class A |

Listing Report FMRC #3D7Q7, July 5, 1997.

A fire retarding semiconductor apparatus passing the FMRC Clean Room Materials Flammability Test Protocol is also disclosed. The apparatus comprises a polymer and a magnesium hydroxide composition, the composition comprising a copolymer of polypropylene and an ethylene/propylene rubber, and at least 50% but not greater than 60% by weight of a magnesium hydroxide coated with an anionic surface active agent, the magnesium hydroxide having (i) a strain in the <101> direction of not more than $3.0 \times 10^{-3}$, (ii) a crystallite size in the <101> direction of more than 800 Å, and (iii) a specific surface area, determined by the BET method, of less than 20 $mg^2/g$. The minimum Notched Izod Impact using ASTM D256 test is 0.5 ft. per pounds per inch. The rubber modified polypropylene and the uniform particle size of the magnesium hydroxide used in the invention, form an extremely uniform geometry of plastic and dispersed mineral resulting in a highly ductile material.

A method for producing a fire retarding polypropylene composition which passes the FMRC Clean Room Material Flammability Test Protocol is also disclosed. The method includes mixing a copolymer of polypropylene and an ethylene/propylene rubber with at least 50% but not greater than 60% by weight of a magnesium hydroxide coated with an anionic surface active agent, the magnesium hydroxide having (i) a strain in the <101> direction of not more than $3.0 \times 10^{-3}$, (ii) a crystallite size in the <101> direction of more than 800 Å, and (iii) a specific surface area, determined by the BET method, of less than 20 $mg^2/g$ at a temperature above a melting point of the copolymer to form a blend. The method preferably includes processing the blend by extrusion, injection molding, or compression molding into articles adapted to be used in a clean room, such as maintenance cleaning benches, water storage cabinets, or building panels.

Polymers which pass the FM 4910 Standard typically have high limiting oxygen indexes, (LOI), greater than 45. The typical method of fire retarding polyolefin materials is to add gas phase FR's that increase the LOI. These Gas Phase FR's bind up the available oxygen in the area surrounding the fire, thereby starving the flames of oxygen. Supporting this theory, PFA (perfluro-alkoxy resin and PTFE (Poly-tetra-fluoro-ethylene), which have LOIs of about 100, and ethylene-trifluorethylene (ECTFE), which has an LOI of about 60, pass the FM 4910 Standard. Polyvinylideneflouride (PVDF), which has an LOI of 45 is on the borderline, while ethylene-trifluoroethylene (ETFE), which has an LOI of 38, does not pass. Polypropylene and the fire retarding polypropylene which has been used in the past, which have LOIs in the range of about 30–35, also do not pass. The FR polypropylene materials burn rather severely. As a result, it was believed that only materials which have a high LOI would pass the FM 4910 Standard. It was also believed that FR polypropylene would not pass because of its low LOI.

The fire retarding polypropylene of the present invention has an LOI of about 30. Therefore, based upon the gas phase theory and previous experience, it would be expected that this material would not pass the FM 4910 Standard. However, surprisingly, the fire retarding polypropylene of the present invention does pass, and it has excellent fire performance properties. It conducts heat away from the surface very rapidly. In addition, it releases water during decomposition which cools the surface. This gives the composition a very high resistance to ignition and fire propagation. The composition also forms an extremely efficient char layer which inhibits the propagation of flames. The high loading of magnesium hydroxide gives the composition a very stiff melt viscosity which prevents tearing open of the char layer in a fire. This combination of properties allows the fire retarding polypropylene of the present invention to pass the FM 4910 Standard.

The fire retarding polypropylene of the present invention utilizes a unique magnesium hydroxide. The magnesium hydroxide, which is described in U.S. Pat. No. 4,098,762, to Miyata et al., is commercially available from Kyowa Chemical Industry Co., Ltd. under the name Kisuma 5A, 5B, or 5J. Kisuma 5J is preferred in the present invention. Magnesium hydroxide is typically used as a secondary fire retardant for smoke suppression in conjunction with other fire retardants. It is rarely used as the primary fire retardant in a polymer system because it does not increase the LOI of the material. However, it was discovered that incorporating high levels of the patented magnesium hydroxide (over about 50% by weight) renders polypropylene extremely resistant to the propagation of fire, smoke, and corrosive combustion by-products in a fire situation.

The level of magnesium hydroxide is preferably in the range of between about 50% and about 60% by weight. Below about 50%, the material does not pass the FM 4910 Standard. When the level exceeds about 60% by weight, it becomes difficult to process the material.

The use of such high loadings of magnesium hydroxide in polypropylene would normally produce a material so brittle that it could not be used as an equipment construction material. However, the combination of the patented magnesium hydroxide and a particular type of polypropylene produces a highly ductile material which can be used for equipment construction. The polypropylene is a copolymer of polypropylene and an ethylene/propylene rubber. The ethylene/propylene rubber, which is grafted into the polypropylene polymer chains, acts as an interchain shock absorber. Among the polypropylene copolymers which can be used in the present invention are Aristech TI4007 from Aristech and Amoco 3045 from Amoco Chemical Co.

The polypropylene pellets and the magnesium hydroxide are intensively mixed and formed into pellets. The pellets can be extruded, injection molded, or compression molded into plastic sheet or other geometric shapes for use in semiconductor chip processing equipment and other semiconductor clean room equipment. The processing can be done using standard plastic fabricating equipment. The following example illustrates the compression molding method of the invention.

EXAMPLE I

Method for Compression Molding Composition to Form a Sheet 1¼ Inches Thick (Net Weight 288 lbs.)

1. Materials are heated in a mold at increasing temperatures for approximately six (6) hours at the following temperatures and pressures:

| Temperature (° F.) | Pressure (ft./lbs. psi) | Length of Time (Hrs:Mins) |
|---|---|---|
| 365 | 500 | 1:10 |
| 370 | 600 | 1:20 |
| 375 | 300 | 3:30 |

2. Materials are cooled in the mold by running cool oil through the mold at a pressure of 1200 ft.-lbs psi.
3. The sheet can then be cut and formed into equipment, such as wet benches and storage cabinet. The pieces can be bonded together using many thermoplastic welding techniques.

The composition of the invention can also be used in the construction of semiconductor chip processing equipment and semiconductor clean room items such as maintenance cleaning benches, water storage cabinets and wall and ceiling panels. However, the preferred system herein described is not intended to be exhaustive or to limit the invention to the precise forms disclosed. They are chosen and described to explain the principles of the invention, and the application of the method to practical uses so that others skilled in the art may practice the invention.

What is claimed is:

1. A method of making a clean room surface component comprised of composition, wherein said composition comprises:
    (a) a copolymer polypropylene resin in which ethylene/propylene rubber has been grafted onto the polypropylene chains; and
    (b) at least about 50% but not greater than 60% by weight of a magnesium hydroxide coated with an anionic surface agent,
    wherein said method includes the steps of:
    (a) forming pieces from said composition, said pieces being adapted to form said clean room surface component; and
    (b) bonding said pieces using thermoplastic welding to make a semiconductor clean room component.

2. A clean room component, said clean room component comprising a polymer and magnesium hydroxide composition, the composition comprising a copolymer polypropylene resin in which ethylene-propylene rubber has been grafted onto the polypropylene chains, and at least about 50% but not greater than 60% by weight of a magnesium hydroxide coated with an anionic surface active agent, the magnesium hydroxide having:
    (i) a strain in the <101> direction of not more than $3.0 \times 10^{-3}$,
    (ii) a crystallite size in the <101> direction of more than 800 Å, and
    (iii) a specific surface area, determined by the BET method, of less than 20 $mg^2/g$; said composition being adapted to meet FMRC standards for use in a clean room.

3. The component of claim 2 wherein said copolymer contains between about 80% and about 85% polypropylene and between about 15% and about 20% ethylene/propylene rubber.

4. The component of claim 2 wherein the melt flow index of said copolymer is less than about 1 gram per 10 minute interval.

5. The component of claim 2 wherein said copolymer is halogen-free.

6. The component of claim 2 having a Young's modulus of at least about 1.0 ft-lbs. psi.

7. A method for producing a fire retarding clean room component, said method comprising the steps of:
    (a) mixing a copolymer polypropylene resin in which ethylene/propylene rubber has been grafted onto the polypropylene chain with at least about 50% but not greater than 60% by weight of a magnesium hydroxide coated with an anionic surface active agent, the magnesium hydroxide having:
    (i) a strain in the <101> direction of not more than $3.0 \times 10^{-3}$,
    (ii) a crystallite size in the <101> direction of more than 800 Å, and
    (iii) a specific surface area, determined by the BET method, of less than 20 $mg^2/g$ at a temperature above a melting point of the copolymer to form a blend; and,
    (b) forming said blend into said clean room component.

8. The method of claim 7 said forming comprising processing said blend into pellets and cooling the pellets.

9. The method of claim 7 said forming comprising processing said blend by extrusion, injection molding, or compression molding into said clean room component.

10. A compression molded clean room surface component comprised of a fire retarding polypropylene composition, wherein the composition comprises:

(a) a copolymer polypropylene resin in which ethylene/propylene rubber has been grafted onto the polypropylene chains; and (b) at least about 50% but not greater than 60% by weight of a magnesium hydroxide coated with an anionic surface agent.

11. A method of making a clean room surface component comprising the steps of:

(a) providing a composition including a copolymer polypropylene resin in which ethylene/propylene rubber has been grafted onto the polypropylene chains; and at least about 50% but not greater than 60% by weight of a magnesium hydroxide coated with an anionic surface agent, the magnesium hydroxide having:

(i) a strain in the <101> direction of not more than $3.0 \times 10^{-3}$, (ii) a crystallite size in the <101> direction of more than 800 Å, and (iii) a specific surface area, determined by the BET method, of less than 20 $mg^2/g$; and (b) compression molding said composition to make a clean room surface component.

* * * * *

UNITED STATES PATENT AND TRADEMARK OFFICE
CERTIFICATE OF CORRECTION

PATENT NO. : 6,348,122 B1
DATED : February 19, 2002
INVENTOR(S) : Wagner

It is certified that error appears in the above-identified patent and that said Letters Patent is hereby corrected as shown below:

Title page,
Item [57], ABSTRACT,
Line 9, please delete "20 mg2/g" and inesrt -- 20 m2/g -- in lieu thereof Signed and Sealed this Fourteenth Day of September, 2004

JON W. DUDAS
*Director of the United States Patent and Trademark Office*